United States Patent [19]

Suhrheinrich

[11] 4,221,667
[45] Sep. 9, 1980

[54] WHIRLFILTER

[75] Inventor: Robert Suhrheinrich, Evansville, Ind.

[73] Assignee: CHEM-FARM INC., Evansville, Ind.

[21] Appl. No.: 29,194

[22] Filed: Apr. 12, 1979

Related U.S. Application Data

[63] Continuation of Ser. No. 878,325, Feb. 16, 1978, abandoned.

[51] Int. Cl.² .............................................. B01D 29/40
[52] U.S. Cl. .................................. 210/304; 210/512 R
[58] Field of Search ............... 210/248, 304, 305, 512, 210/499

[56] References Cited

U.S. PATENT DOCUMENTS

| | | | |
|---|---|---|---|
| 1,100,435 | 6/1914 | Lance | 210/512 |
| 1,202,356 | 10/1916 | Blackmer | 210/512 |
| 2,010,435 | 8/1935 | Matheson | 210/512 R |
| 2,390,841 | 12/1945 | Longden | 210/304 |
| 2,511,967 | 6/1950 | Campbell | 210/512 |
| 3,020,950 | 2/1962 | Schraivogel | 210/304 X |
| 3,061,098 | 10/1962 | Brezinski | 210/304 X |
| 3,363,771 | 1/1968 | Walters | 210/304 X |
| 3,674,154 | 7/1972 | Sicard | 210/499 |
| 3,847,817 | 11/1974 | Jarman | 210/304 |
| 3,875,063 | 4/1975 | Treplin et al. | 210/304 |

*Primary Examiner*—Theodore A. Granger
*Attorney, Agent, or Firm*—Trexler, Wolters, Bushnell & Fosse, Ltd.

[57] ABSTRACT

A filter is described for separating solid particles and breaking down dense masses from a liquid carrier, and for promoting mixing of friable, dry material with the liquid. The filter comprises a housing having an interior wall of substantially circular cross-sectional configuration. A cylindrical filter member is carried inside the housing but is spaced apart from the housing interior wall. A circular fluid flow path is thus defined between the wall and the filter member. A liquid outlet port is defined in the housing and communicates with the inside of the filter member. A liquid inlet port is oriented so as to direct the fluid flow over and past the filter so as to cause an extending filtering and filter-cleaning action.

4 Claims, 4 Drawing Figures

WHIRLFILTER

This is a continuation of application Ser. No. 878,325 filed Feb. 16, 1978, now abandoned.

BACKGROUND OF THE INVENTION

This invention relates generally to filters and more particularly concerns a compact and inexpensive filter for removing solid particles from a flow of liquid chemicals such as fertilizers, and for promoting mixing of dry materials with a liquid carrier.

The use of chemicals in agriculture is so important in modern farming as to be an indispensable part of the farm environment. Many of these chemicals, whether insecticides, herbicides, fertilizers, or other materials, are offered in liquid form. In preparing them for use, they must be transferred between tanks, mixed, and otherwise handled.

In many such liquid chemical handling operations it is important to separate the liquid chemicals from any foreign particles such as dirt, rust, pebbles, or the like. Removal of these solid particles protects expensive mechanical equipment, prevents equipment clogging, and in some cases may make the difference between success and failure in achieving a desired result with the liquid.

To remove these solid particles, filters are widely used. Many such filters, however, present almost as much difficulty to the filter user as do the solid particles themselves. Many filters or strainers are arranged to direct a flow of liquid in a direction oriented perpendicularly to a filtering screen. After a period of use, the filtering screen becomes partially closed from the collection of foreign particles. When clogging has increased and the flow of liquid through the filter screen has correspondingly decreased to unacceptable levels, the fluid flow must be halted, the filter housing opened, the screen removed, cleaned and replaced, and the housing then reassembled. Since many such housings require gaskets, it can be a difficult task to replace the gasket and reassemble the filter housing without damaging either the screen or the gasket. In some cases, the gasket itself must be discarded and a new gasket installed, thereby increasing the labor time and material cost.

In other filters, rapid flow of fluid at even a moderate pressure may cause collapse of the filtering screen and its disassociation from screen-holding parts in the filter housing. Under these conditions, unfiltered fluid can pass through the filter device, and the unwanted solid particles are not caught.

In other situations, dry, friable chemicals are dissolved or suspended in water to some other liquid carrier to form a desired treatment liquid. Under some circumstances, this mixing action is somewhat incomplete, and the tank contains a liquid and small clumps or nuggets of undissolved or unsuspended matter. Many previously offered filters will trap such clumps or nuggets but will not promote their breakup and dissolution in the liquid, because liquid in these filters is not flowing rapidly, or at least is not flowing in such a way as to encourage particle breakup and dissolution. When the filter is cleaned, these particles are removed and are wasted.

It is accordingly the general object of the present invention to provide an inexpensive, nonclogging, rugged and reliable filter mechanism for removing solid particles from a flow of liquid such as an agricultural chemical, and for encouraging the dissolution of unmixed, friable particles in a liquid carrier.

More specifically, it is an object of the present invention to provide a filter for such uses which provides a self-cleaning action to the filter member screen.

Another object is to provide such a filter which does not restrict the flow of fluid through the filter device. A correlated object is to provide such a filter which requires only relatively low internal pressures within the filter mechanism.

A further object is to provide such a filter in a form having a filtering screen which is assembled within the filter so as to inhibit screen collapse and subsequent loss of filtering action.

Yet another object is to provide a filter mechanism of the type described from which the filtered solid particles can be easily removed without disassembling the filter housing. A related object is to provide such a filter in which the solid particles can be removed without damaging or even disturbing the gasket member carried between major housing parts.

Yet another object is to provide a filter of the type described in a small and compact housing.

Other objects and advantages of the invention will become apparent upon reading the following detailed description and upon reference to the drawings.

Throughout the drawings, like reference numerals refer to like parts.

DETAILED DESCRIPTION

While the invention will be described in connection with a preferred embodiment, it will be understood that it is not intended to limit the invention to this embodiment. On the contrary, it is intended to cover all alternatives, modifications and equivalents as may be included within the spirit and scope of the invention as defined by the appended claims.

Figure 1:
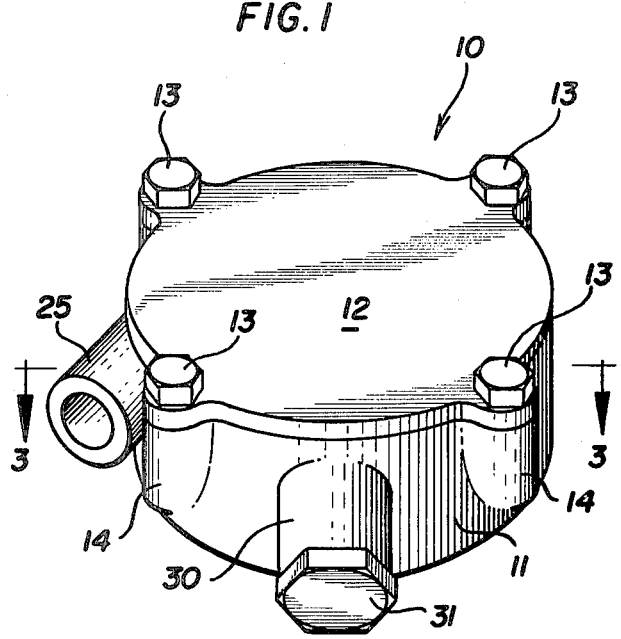
FIG. 1 is a perspective view showing the novel filter of the present invention in its general aspects.
Figure 2:
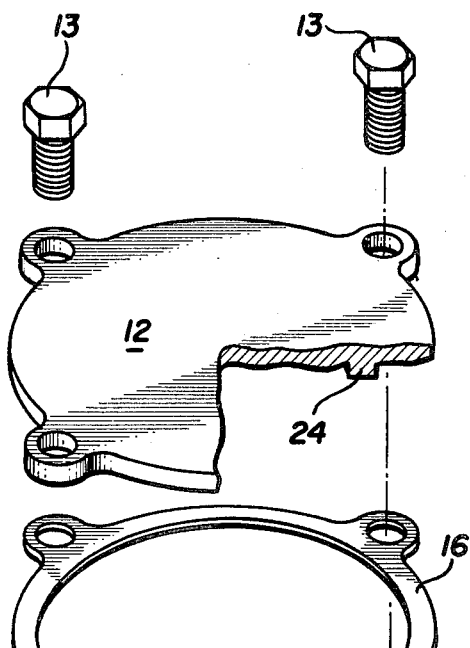
FIG. 2 is an exploded view showing the major portions of the filter.

Turning first to FIGS. 1 and 2, there is shown a filter device 10 embodying the present invention. In general, the filter 10 can be considered to include a basin-like housing member 11, the top of which is closed by a top plate 12. This top plate 12 is bolted to the base 11 by bolts 13 received in tapped embossments 14 in the housing bottom 11 and the top cover plate 12. A gasket 16, formed of suitable gasket material, is shaped and sized to cover the top surface 17 of the housing bottom 11. A foraninous filter member, such as a wire mesh screen 19, is carried within the housing bottom 11.

In accordance with the present invention, the clogging of this foraninous screen member 19 by solid particles is discouraged. To this end, the filter is so constructed as to cause a whirling or swirling action of the liquid flowing through the filter, as indicated by the arrows F in FIG. 3, prior to liquid passage through the screen 29 and subsequent discharge from the filter 10. This whirling, swirling flow across the face of the screen 19 tends to continuously wipe or clean the screen 19 of any foreign particles. Further, a large area of screen 19 can be provided in the relatively compact housing members 11 and 12.

Figure 3:
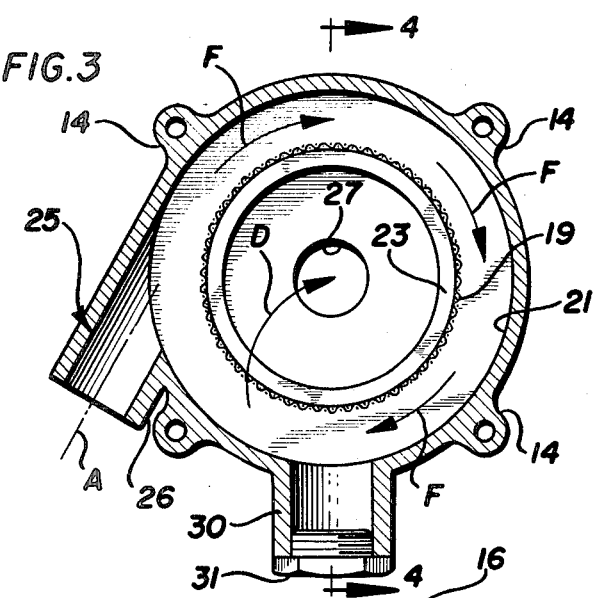
FIG. 3 is a sectional view of the filter taken substantially in the plane of line 3—3 in FIG. 1.
Figure 4:
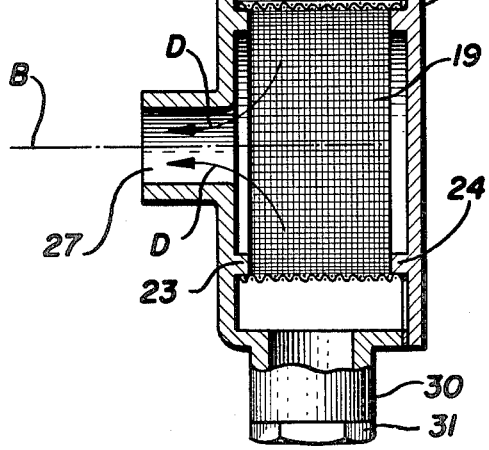
FIG. 4 is a sectional view of the filter taken substantially in the plane of line 4—4 in FIG. 3.

To cause this whirling, swirling liquid flow, the housing bottom 11 is constructed so as to provide an interior wall 21 of substantially circular cross-sectional configuration, as best seen in FIG. 3. The filter screen 19 itself is formed in the shape of a right circular cylinder, and is surroundingly mounted on and about annular embossments 23 and 24 formed, respectively, in the housing bottom 11 and top 12, as shown in FIGS. 2 and 4. It will be noted that, in this way, a fluid flow path is defined between the wall 21 and the filter screen 19; in the present embodiment, this flow path is circular and is endless, and thus, permits a circulation and recirculation of liquid without the generation of high pressures within the filter 10.

In accordance with another important aspect of the invention, this whirling, swirling endless fluid flow around and past the filter screen 19 is promoted by providing a fluid inlet 25 which is oriented so as to have its axis A oriented substantially tangentially to the filter screen 19. Fluid flow in the desired manner is assisted by forming the inlet 25 so as to be of an elongated nature, as by providing the inlet embossment 26.

To encourage the filtering screen 19 to be retained in its desired location, to discourage leaks from the filter 10, liquid is carried through and is discharged from the filter 10 in a low-pressure state. As indicated in FIGS. 3 and 4, after the fluid passes through the filter 19, the fluid is discharged through a centralized discharge or outlet toward 27, i.e., fluid flow occurs in the general direction shown by the arrows D in FIGS. 3 and 4.

To make easy and inexpensive the construction of the filter housing member 11 in accordance with a further aspect of the invention, it will be noted that this discharge port 27 is of circular cross-sectional aspect, and the axis or Center B of this discharge port 27 is located coincidentally with the center of the circular screen-retaining embossment device 23 and, indeed, is coincidental with the center of the housing interior wall 21. By orienting the inlet axis of fluid flow A in a direction which extends substantially perpendicularly to the outpet axis of fluid flow B, and by orienting the inlet axis A in a direction which is, moreover, offset from the outlet axis B, the desired swirling, whirling motion is provided in the liquid, as the liquid moves from the inlet 25, through the filter screen 19 and through the outlet 27.

In accordance with still another important aspect of the invention, the solid particles which have been worked from the screen can be quickly and easily removed from the filter without disassembling the filter housings, as by removing the cover 12 from the housing bottom 11. To this end, an elongated filter sump extends radially away from remaining portions of the filter, and is provided at a position which is intended to be located at the bottom or lowest part of the filter 10. At the distal end of the sump is a plug 31. By removing the plug 31, the solid particles can be quickly and easily reinstalled; no gasket is required, and no gasket thus need be replaced. Filter cleaning is reduced to a short and simple operation.

The invention is claimed as follows:

1. A compact and relatively small filter assembly comprising a cylindrical housing having an annular sidewall of relatively short axial extent and a pair of planar end walls, said annular sidewall defining a diameter greater than the axial extent of the housing; a foranimous cylindrical filter member of right cylindrical configuration disposed within said housing between and enclosed by said housing end walls and having a diameter dimension smaller than the diameter dimension of said housing annular sidewall with its central axis coincident with the central axis of said housing defining therewith an annular passage exteriorly of the filter member and an inner cavity within the filter member; an outlet extending from said inner cavity substantially perpendicular to one of said end walls, having an axis co-incident to the central axis of said housing and said filter member and arranged to be substantially horizontally disposed when said assembly is operative; an inlet extending through said housing annular wall and communicating with said annular passage, said inlet being arranged with the center axis thereof disposed substantially centrally relative to the axial extent of the housing annular passage for directing the liquid to be filtered substantially tangentially to and throughout substantially the axial extent of the filter member within said annular passage to promote circular flow of the liquid within said annular passage without the generation of high pressure within said housing, and a sump recess within said housing annular wall having a center axis in substantially the plane of the inlet center axis, extending substantially perpendicularly to the center axis of said outlet, and arranged to be substantially vertically disposed when said assembly is operative and said recess being substantially centrally disposed relative to the axial extent of the housing annular passage for opening directly and radially away from the bottom of said annular passage and the circulating path of liquid flow so as to remove and retain by gravity filtered solid particles out of the circulating liquid path.

2. A filter assembly according to claim 1 wherein said foranimous member is a wire mesh screen.

3. A filter assembly according to claim 1 further including a sump plug being removable from the sump recess for removing the filtered particles from the filter assembly.

4. A filter assembly according to claim 1 wherein each of the housing planar end walls includes an inwardly extending annular embossment nested with a corresponding terminal edge of the filter member for support while leaving the remnant shallow axial extent therebetween clear for filtering.

* * * * *